United States Patent
Salomon et al.

(10) Patent No.: US 12,147,690 B2
(45) Date of Patent: Nov. 19, 2024

(54) SHARING NODE STORAGE RESOURCES WITH THE ENTIRE CLUSTER

(71) Applicant: Red Hat, Inc., Raleigh, NC (US)

(72) Inventors: Yehoshua Salomon, Ra'anana (IL); Gabriel Zvi BenHanokh, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 182 days.

(21) Appl. No.: 17/992,761

(22) Filed: Nov. 22, 2022

(65) Prior Publication Data

US 2024/0168663 A1    May 23, 2024

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01)

(58) Field of Classification Search
CPC ....... G06F 3/0631; G06F 3/0604; G06F 3/067
See application file for complete search history.

(56) References Cited

U.S. PATENT DOCUMENTS

| | | | |
|---|---|---|---|
| 7,930,397 B2 | 4/2011 | Midgley | |
| 8,924,539 B2 * | 12/2014 | Ferris | G06F 9/5072 709/224 |
| 9,448,852 B2 | 9/2016 | Vemulapalli et al. | |
| 9,606,831 B2 * | 3/2017 | Ferris | G06F 9/4856 |
| 10,298,670 B2 | 5/2019 | Ben-Shaul et al. | |
| 10,331,420 B2 | 6/2019 | Nagar et al. | |
| 2010/0223364 A1 | 9/2010 | Wei | |

FOREIGN PATENT DOCUMENTS

| | | |
|---|---|---|
| CN | 105471695 A | 4/2016 |
| CN | 109343928 B | 2/2022 |

OTHER PUBLICATIONS

Strufe et al., BCBS: An Efficient Load Balancing Strategy for Cooperative Overlay Live-Streaming, 2006, IEEE, pp. 304-309 (Year: 2006).*

Janakiram MSV. "How Kubernetes Provides Networking and Storage to Applications", The New Stack (Sep. 15, 2020), https://thenewstack.io/how-kubernetes-provides-networking-and-storage-to-applications/ , 6 pages.

\* cited by examiner

*Primary Examiner* — Gary W. Cygiel
(74) *Attorney, Agent, or Firm* — Womble Bond Dickinson (US) LLP

(57) ABSTRACT

Embodiments of the present disclosure relate to systems and methods for enabling a compute node to utilize all the resources of the cluster it is part of when accessing block storage resources. A deployment manager may receive configuration information for each of a set of compute nodes in a cluster, wherein the configuration information of each compute node in the cluster indicates a usage by the compute node of each of a set of block storage volumes (also referred to herein as storage volumes). The deployment manager determines that a first compute node cannot utilize a full amount of the storage volume bandwidth provided by one or more storage volumes assigned to it. A first storage volume of the one or more storage volumes may be reassigned to a second compute node in the cluster and deploys the cluster with the first storage volume mounted on the second compute node.

20 Claims, 7 Drawing Sheets

SHARING NODE STORAGE RESOURCES WITH THE ENTIRE CLUSTER

TECHNICAL FIELD

Aspects of the present disclosure relate to cluster management, and more particularly, to enabling a compute node to utilize the resources of an entire cluster.

BACKGROUND

A container orchestration engine (such as the Kubernetes' platform) may be a platform for developing and running containerized applications and may allow applications and the data centers that support them to expand from just a few machines and applications to thousands of machines that serve millions of clients. Container orchestration engines comprise a control plane and a cluster of compute nodes on which pods may be scheduled. A pod may refer to one or more containers deployed together on a single host, and is the smallest compute unit that can be defined, deployed, and managed by the control plane. The control plane may include a scheduler that is responsible for scheduling new pods onto compute nodes within the cluster.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Figure 1:
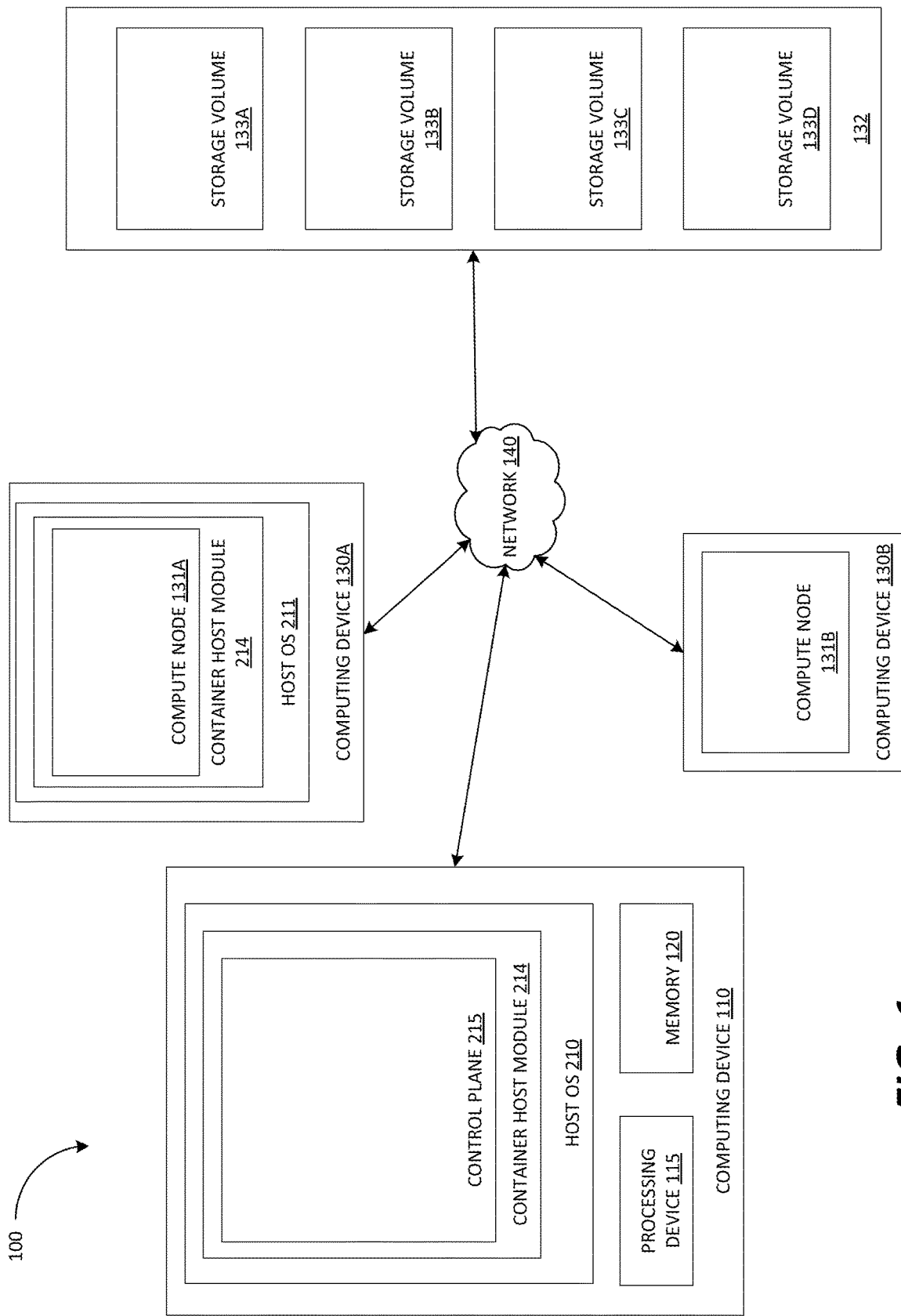
FIG. 1 is a block diagram that illustrates an example system, in accordance with some embodiments of the present disclosure.

DETAILED DESCRIPTION in block storage, when a node from a cluster wants to access a storage volume of a block storage system of a public cloud, there are two limitations on the bandwidth between the node and the block storage system/volume(s). The first limitation may be referred to as storage volume bandwidth and may be based on the size and type of the storage volume. Storage volumes may come in different sizes and types, and in a simple cloud provider price plan, a cloud provider may have assigned a certain bandwidth to storage volumes of each size/type. For example, a storage volume of type A and 100 GB size may be assigned X bandwidth, while an storage volume of type A and 200 GB size may be assigned 2× bandwidth etc. The second limitation may be referred to as node bandwidth and may be based on the size of the node. In a simple compute cluster price plan, a compute cluster provider may provide compute nodes of different sizes and may assign a compute nodes of each size a fixed amount of node bandwidth. Thus, if there are two storage volumes that can each provide an storage volume bandwidth of X (or Y IOPS), a compute node with less than 2× node bandwidth can utilize the full X storage volume bandwidth from only one of the storage volumes as long as the other storage volume is not loaded, but cannot utilize the full 2× storage volume bandwidth that would be provided by both storage volumes together simultaneously.

However, cloud provider price plans often involve a fixed fee for the size/type of storage volumes included in their plan. Although some plans provide a fixed price regardless of the size/type of storage volumes included in their plan, these plans often charge additional amounts based on the amount of I/O operations that are performed. As a result, a user has to pay for storage volumes of that size/type even they don't or are unable to use all of the storage volume bandwidth associated with it.

However, the bandwidth requirement of every compute node in the cluster is not the same. Some compute nodes (e.g., nodes running web servers) require very little bandwidth and access storage volumes infrequently. As a result, they often do not use their node bandwidth allocation resulting in wasted node bandwidth.

The present disclosure addresses the above-noted and other deficiencies by enabling a compute node to utilize all the resources of the cluster it is part of. A deployment manager may receive configuration information for each of a set of compute nodes in a cluster, wherein the configuration information of each compute node in the cluster indicates a usage by the compute node of each of a set of block storage volumes (also referred to herein as storage volumes). The deployment manager may determine, based on the configuration information, that a first compute node cannot utilize a full amount of the storage volume bandwidth provided by one or more storage volumes assigned to it based on e.g., a storage subscription plan. The deployment manager may reassign a first storage volume of the one or more storage volumes to a second compute node in the cluster. The first storage volume may be determined based on information provided by a user regarding the requests serviced by each of the set of storage volumes. The second compute node may be determined based on the available bandwidth of each of the set of compute nodes in the cluster. The deployment manager may deploy the cluster with the first storage volume mounted on the second compute node in the cluster.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi'm hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130A respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS 210 of computing device 110 and the host OSs of computing devices 130A and 130B, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host 214 provides a function-based architecture of smaller, decoupled units that work together. By their nature, containerized applications are separated from the operating systems where they run and, by extension, their users.

A typical deployment of the container host 214 may include a control plane 215 and a cluster of compute nodes 131, including compute nodes 131A and 131B (also referred to as compute machines). The control plane 215 may expose applications to internal and external networks by defining network policies that control communication with containerized applications (e.g., incoming HTTP or HTTPS requests for services inside the cluster). The compute nodes 131 may run the aspects of the container host 214 that are needed to launch and manage containers, pods, and other objects. For example, a worker node may be a physical server that provides the processing capabilities required for running containers in the environment. A worker node may also be implemented as a virtual server, logical container, or GPU, for example.

The system 100 may also include a block storage system 132 which may include a plurality of network block storage (NB S) volumes 133A-D (hereinafter referred to as storage volumes 133A-D). The storage volumes 133A-D may provide high-performance and high-availability block storage for applications executing on the compute nodes 131. The system 100 may be implemented on any hybrid cloud platform, and each of the compute nodes 131 may be implemented as e.g., an EC2 instance (in Amazon AWS™ cluster). When a compute node 131 wants to access a storage volume 133, there are two limitations on the bandwidth between the compute node 131 and the storage volume 133. The first limitation relates to the size and type of the storage volume, and the second limitation relates to the size of the compute node. Thus, if there are e.g., two storage volumes that can each provide a bandwidth of X (or Y IOPS), a compute node 131 with more than X capacity but less than 2× capacity can get the full X bandwidth from one of the storage volumes as long as the other storage volume is not loaded, but cannot get the full 2× bandwidth that would be provided by both storage volumes together simultaneously.

Figure 2:
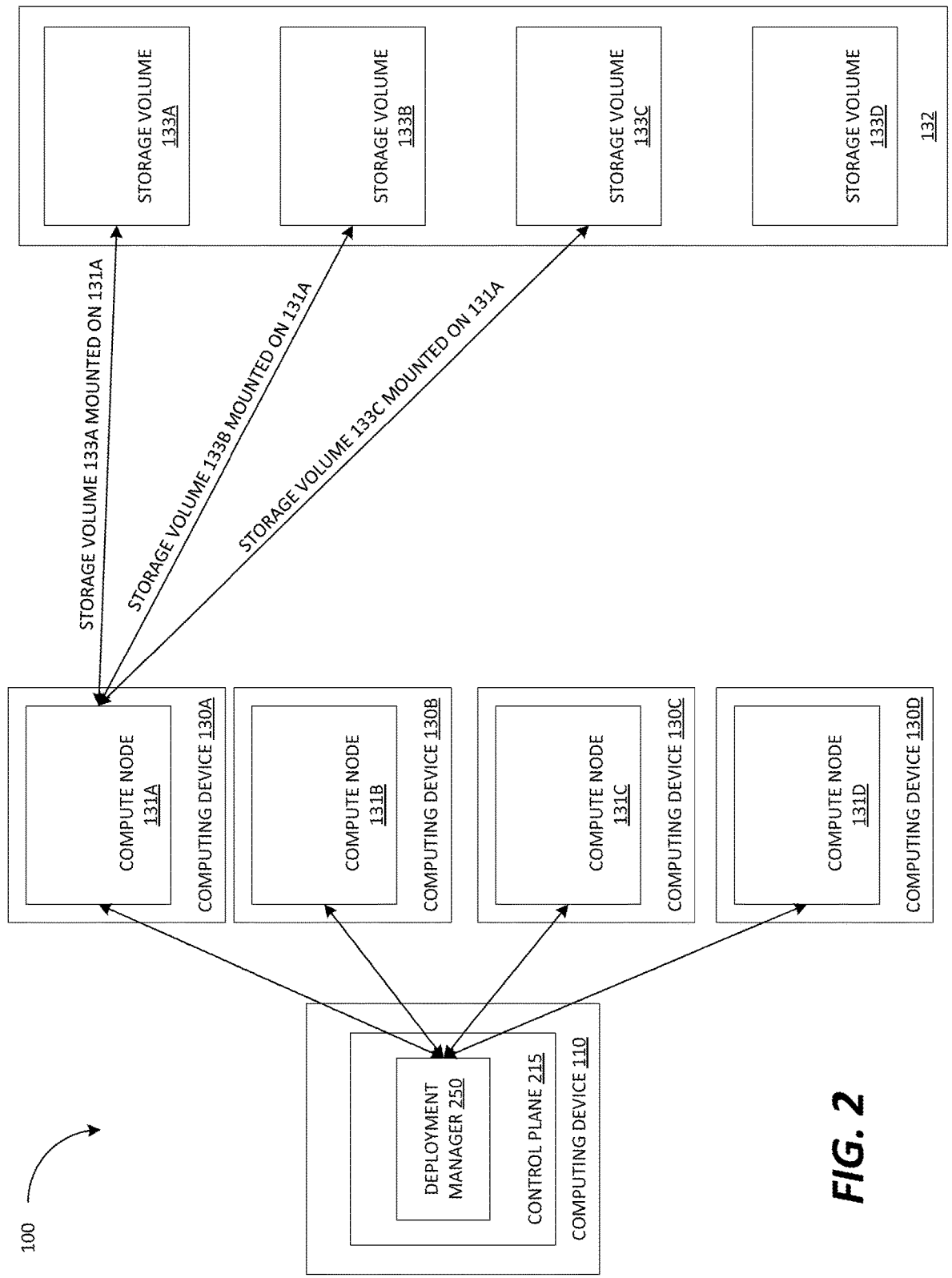
FIG. 2 is a block diagram that illustrates an example system, in accordance with some embodiments of the present disclosure.

Referring now to FIG. 2, the control plane 215 may include a deployment manager 250 that may determine a compute node 131 on which each workload may be deployed. Some workloads (e.g., database servers) require a large amount of storage network bandwidth for accessing the block storage system 132, while other workloads (e.g., web servers) require a much lower amount of bandwidth for accessing the block storage system 132. Because workloads requiring large amounts of bandwidth and those requiring smaller amounts of bandwidth may be deployed on different compute nodes 131, embodiments of the present disclosure provide techniques for utilizing the storage bandwidth of the compute nodes 131 on which workloads requiring smaller amounts of bandwidth are deployed to assist compute nodes 131 on which workloads requiring large amounts of storage bandwidth are deployed. FIG. 2 may illustrate the cluster (e.g., compute nodes 131A-C) when it is deployed in accordance with a cloud storage pricing plan that the user of compute node 131A is subscribed to. As can be seen, storage volumes 133A-C which are assigned to the user of compute node 131A are mounted on compute node 131A. However, the storage volumes 133A-C may each have 3 GB of storage volume bandwidth, while the compute node 131A has 8 GB of node bandwidth. As a result, if the storage volumes 133A-C are all mounted on the compute node 131A, it may be unable to take advantage of the full storage volume bandwidth offered by each of the storage volumes 133A-C.

Figure 3A:
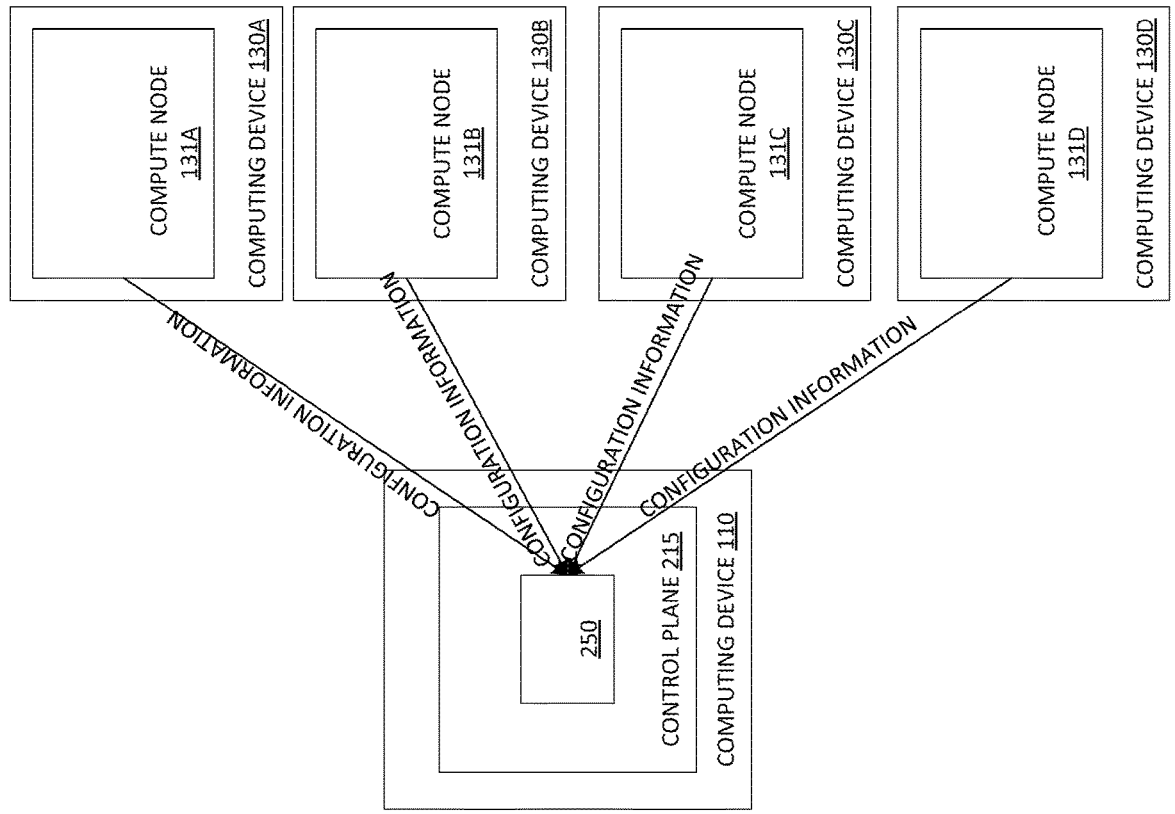
FIG. 3A is a block diagram that illustrates an example system for enabling a compute node to utilize the resources of an entire cluster, in accordance with some embodiments of the present disclosure.

Referring now to FIG. 3A, in accordance with embodiments of the present disclosure, during cluster deployment the deployment manager 250 may obtain for each compute node 131, configuration information of each compute node 131. The configuration information of each compute node 131 may indicate the utilization of each storage volume 133 by that compute node 131. The configuration information of a compute node 131 may be based on static configuration information including configuration information gathered from the compute node 131, expected configuration information (which may be provided by a user of the compute node 131), predicted usage information (which may be provided by the compute node 131 itself), and/or max configuration information (i.e., the maximum bandwidth of the compute node 131). In some embodiments, the configuration information may include real usage data (i.e., non-static configuration information) if this information is accessible at the time of cluster configuration. The configuration information of each compute node 131 may indicate that compute node 131A may be a high bandwidth usage compute node, accessing storage volumes 133A-C on a regular basis, while indicating that compute nodes 131B and C may be low bandwidth usage compute nodes that do not have significant storage volume 133 access needs. The deployment manager 250 may further determine the available node bandwidth of each of the compute nodes 131.

Figure 3B:
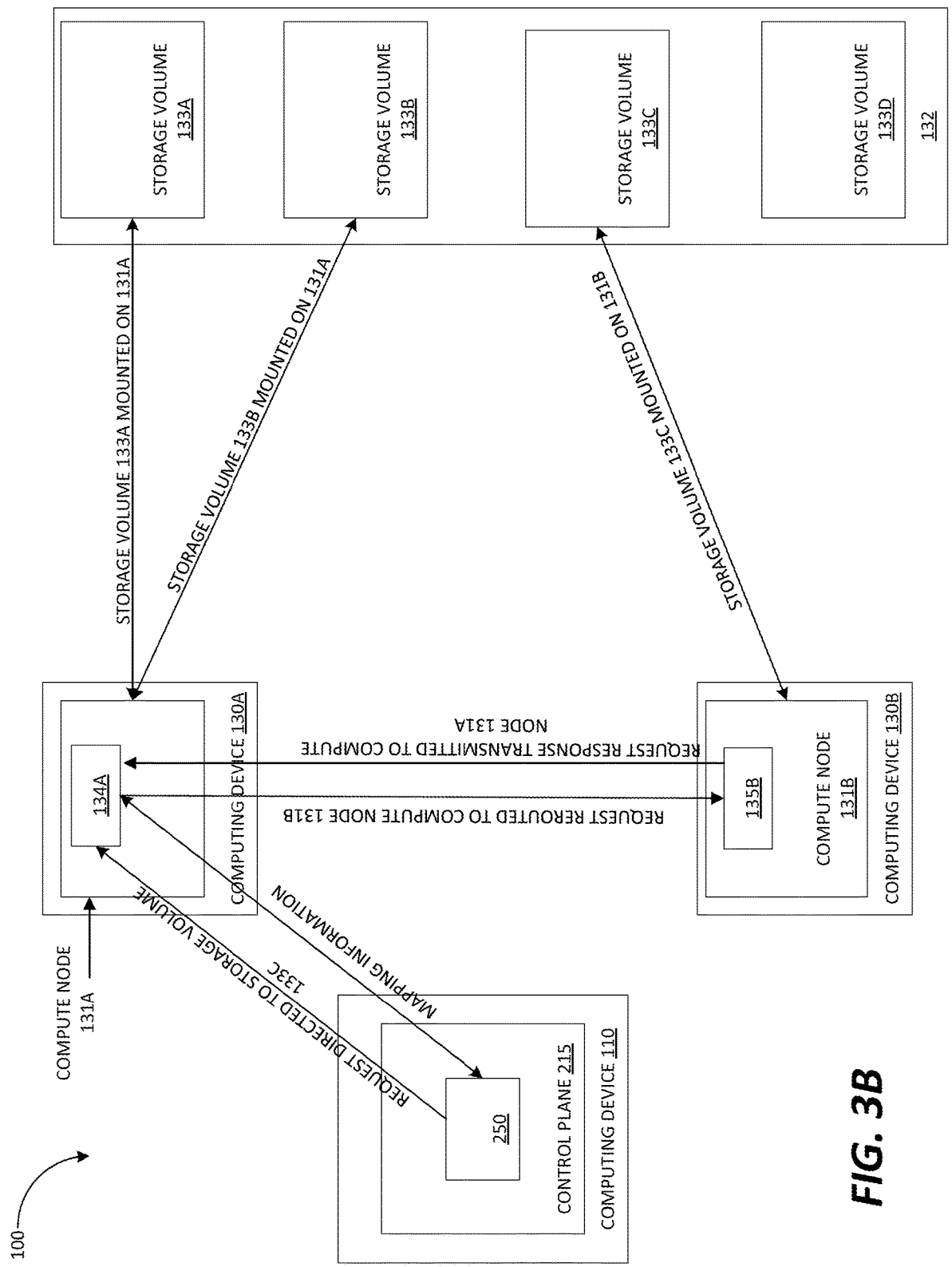
FIG. 3B is a block diagram that illustrates an example system for enabling a compute node to utilize the resources of an entire cluster, in accordance with some embodiments of the present disclosure.

In the example of FIGS. 3A and 3B, the deployment manager 250 may determine that compute node 131A (having 8 GB of node bandwidth) is unable to take advantage of the full 3 GB of storage volume bandwidth offered by each of the storage volumes 133A-C. The deployment manager 250 may further determine that among compute nodes 131B and C, compute node 131B may have the largest amount of available node bandwidth (e.g., 5 GB compared to 2 GB for compute node 131C). The deployment manager 250 may further receive input from a user of compute node 131A indicating e.g., whether certain storage volumes among storage volumes 133A-C service high or low priority requests, whether certain storage volumes 133 must service their requests in a particular time frame. In the example of FIGS. 3A and 3B, the deployment manager 250 may receive input from the user of compute node 131A indicating that storage volume 133C may service lower priority requests while storage volumes 133A and B service high priority requests requiring fast turn-around times. Based on the configuration information of each compute node 131, the available bandwidth of each of the compute nodes 131B and C, and the user indication that storage volume 133C services lower priority requests, the deployment manager 250 may determine that when the cluster is deployed, storage volume 133C should be mounted on compute node 131B.

Figure 3C:
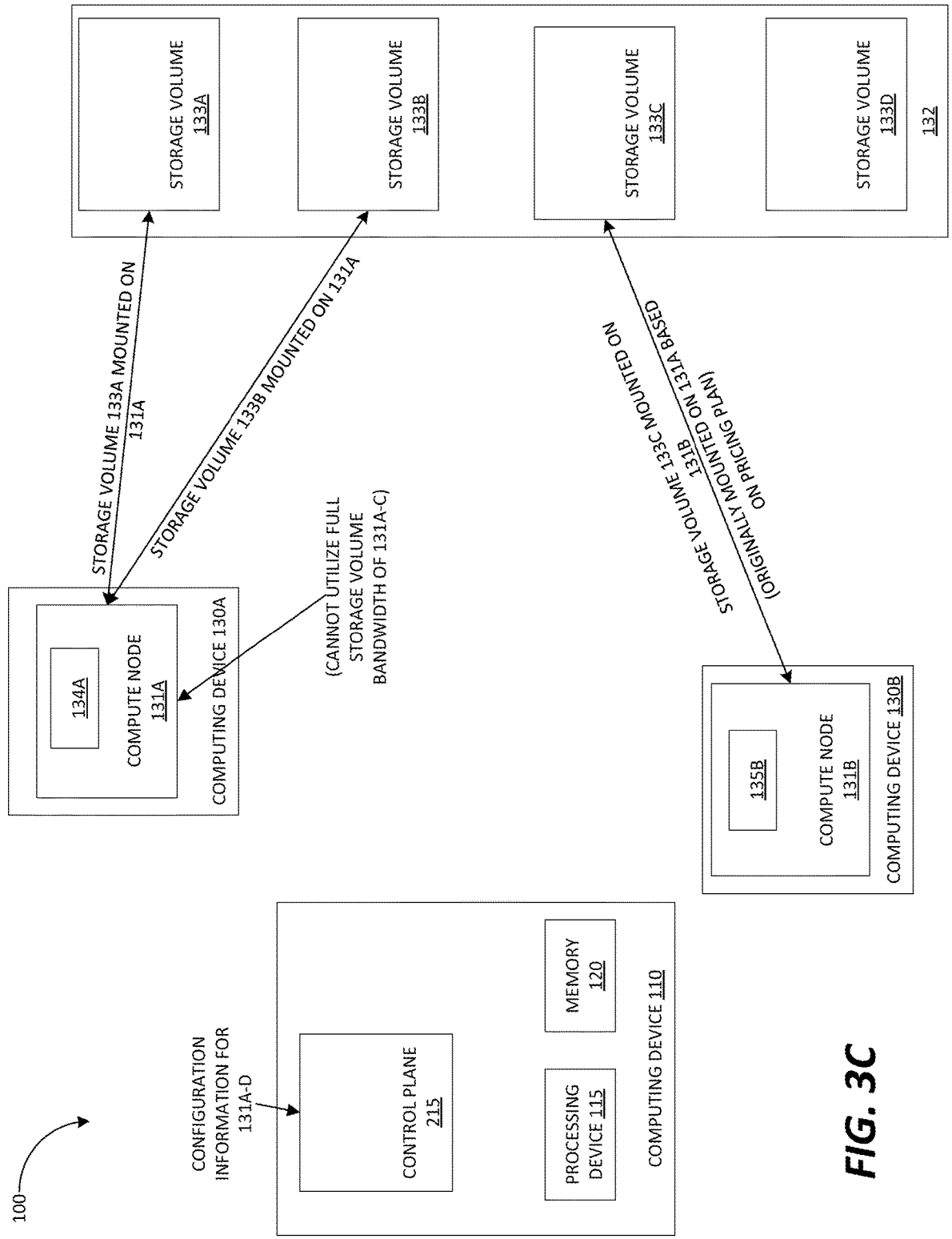
FIG. 3C is a block diagram that illustrates an example system for enabling a compute node to utilize the resources of an entire cluster, in accordance with some embodiments of the present disclosure.

Referring to FIGS. 3B and 3C, once the deployment manager 250 has deployed the cluster with storage volume 133C mounted on compute node 131B, the compute node 131A may begin redirecting requests that require access to storage volume 133C. More specifically, the compute node 131A may be deployed with a redirecting driver 134A mounted thereon. The redirecting driver 134A may communicate with the deployment manager 250 to maintain a mapping of where (which compute node 131) each storage volume 133 that was originally supposed to be mounted on the compute node 131A is currently mounted. In addition, the redirecting driver 134A may appear to the user of compute node 131A as a normal interface to the block storage system 132 when a request is sent to it. The redirecting driver 134A may receive requests sent to the compute node 131A that require access to storage volume 133C and redirect those requests to the compute node 131 on which the storage volume 133C is mounted, i.e., compute node 131B. It should be noted that although illustrated as having only a single redirecting driver 134A, this is not a limitation and one or more redirecting drivers 134 may be implemented on compute node 131A or distributed over the plurality of compute nodes 131, with each redirecting driver 134 configured to redirect requests to a particular storage volume 133 to a compute node 131 on which the particular storage volume 133 is now mounted. Because each storage volume 133 has its own redirecting driver 134 instance, there is no need for a single redirecting driver 134 to maintain a mapping of multiple storage volumes 133. Instead, each particular redirecting driver 134 may have a single mapping of where (which compute node 131) each storage volume 133 that was originally supposed to be mounted on the particular redirecting driver 134's corresponding compute node 131 is currently mounted.

The compute node 131B may route the request to the storage volume 133C to fulfill the request. The storage volume 133C may process the request and send the request response back to the compute node 131B which may send the request response to the compute node 131A. The compute node 131B may have a storage driver 135B which may be a standard driver that facilitates communication with the storage volume 133C and routing of a request redirected from the compute node 131A to the storage volume 133C and routing of a request response from the storage volume 133C to the compute node 131A.

In this way, the system 100 may utilize inter-cluster bandwidth (which is usually a resource with more bandwidth) to distribute the storage volumes 133 of the block storage system 132 among all the compute nodes 131. Stated differently, the techniques described herein may enable the compute node 131A to utilize the resources of the entire cluster (including the 5 GB of available node bandwidth of computing device 131B) when accessing storage volumes 133 and not rely solely on the resources that are assigned to the compute node 131 (e.g., based on a pricing plan) so as to take advantage of all of the storage volume bandwidth assigned to it. Thus, although storage volumes 133A-C may each have 3 GB of storage volume bandwidth and the compute node 131A has 8 GB of node bandwidth, because the compute node 131A can utilize the node bandwidth of the entire cluster including the 5 GB of available node bandwidth of compute node 131B, it may now take advantage of the full 9 GB of storage volume bandwidth offered by the storage volumes 133A-C. It should be noted that because utilization of node bandwidth of other compute nodes 131 requires an extra network hop (so the request can be rerouted to the appropriate computing device), this will add latency to the completion of the request. However, the ability to utilize the entire storage volume bandwidth is often more important than the addition of a small amount of latency due to an extra network hop. In some embodiments, the ability to deploy a cluster in such a manner so as to utilize the inter-cluster bandwidth as discussed herein may be a configuration of the deployment manager 250 that a user can toggle on or off based on their specific use case.

Although the example of FIGS. 3A-3C discuss the remounting of a single storage volume 133, it should be noted that the deployment manager 250 may remount any number of storage volumes that are originally mounted on a particular compute node to another compute node based on the criteria discussed herein in order to allow utilization of inter-cluster node bandwidth.

As discussed herein above, pricing plans offered by block storage providers often result in the user wasting money because they are unable to take advantage of the full storage volume bandwidth offered by their fixed price plan. The above-described techniques allow a user to maximize the value derived from their cloud storage pricing plan so that less money is wasted.

Figure 4:
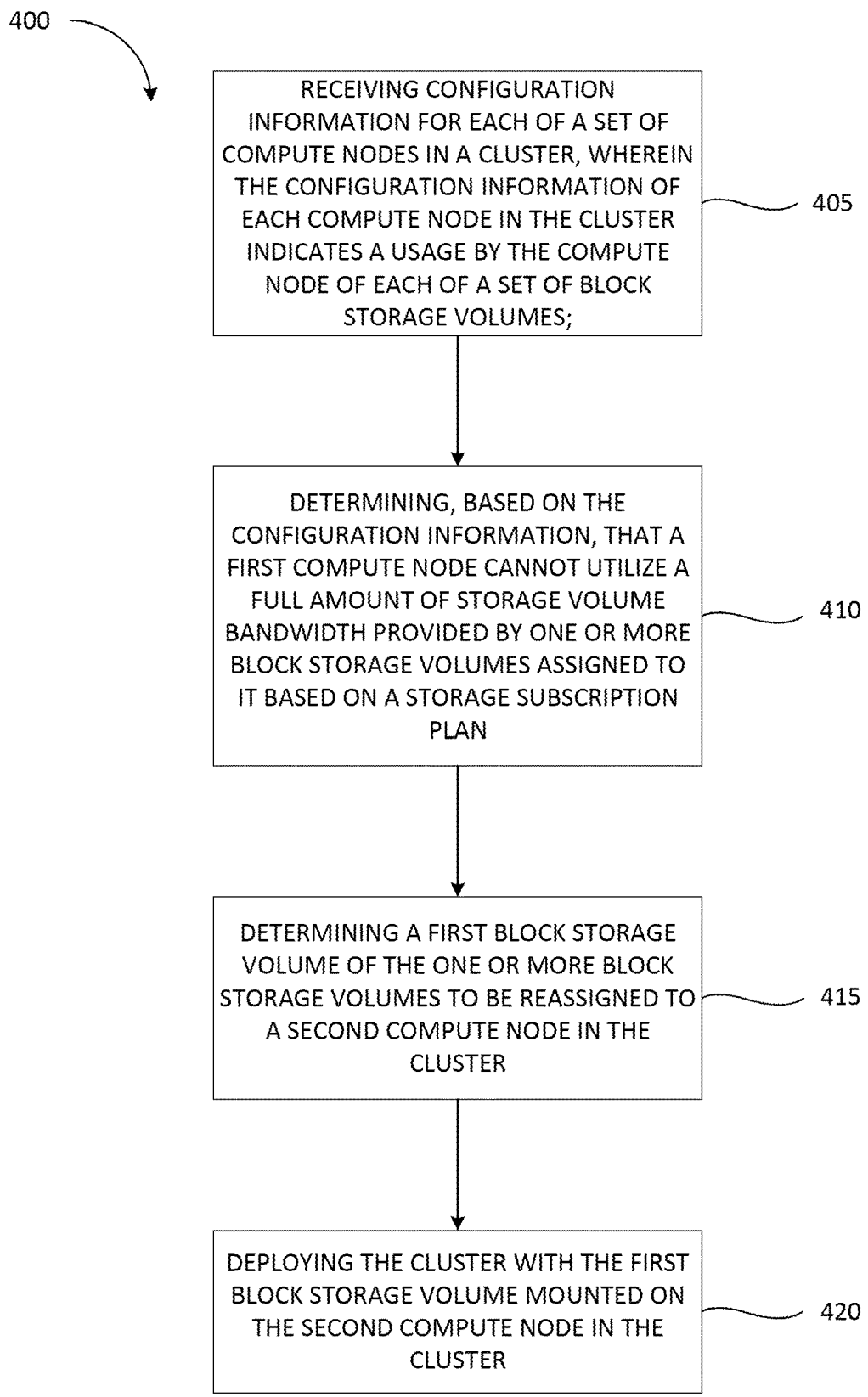
FIG. 4 is a flow diagram of a method for enabling a compute node to utilize the resources of an entire cluster, in accordance with some embodiments of the present disclosure.

FIG. 4 is a flow diagram of a method 400 for enabling a compute node to utilize all the resources of the cluster it is part of, in accordance with some embodiments of the present disclosure. The method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof in some embodiments, the method 400 may be performed by a computing device (e.g., computing devices 110 and 130 illustrated in FIGS. 3A and 3B).

Referring simultaneously to FIG. 3A, at block 405 the deployment manager 250 may obtain for each compute node 131, configuration information of each storage volume 133 of the block storage system 132 during cluster deployment. The configuration information of each compute node 131 may indicate the utilization of each storage volume 133 by that compute node 131. The configuration information of each compute node 131 may indicate that compute node 131A may be a compute node accessing storage volumes 133A-C on a regular basis, while indicating that compute nodes 131B and C may be compute nodes that do not have significant storage volume 133 access needs. The deployment manager 250 may further determine the available node bandwidth of each of the compute nodes 131A-C.

At block 410, the deployment manager 250 may determine that compute node 131A (having 8 GB of node storage bandwidth) is unable to take advantage of the full 3 GB of storage volume bandwidth offered by each of the storage volumes 133A-C (total 9 GB of storage volume bandwidth). The deployment manager 250 may receive input from a user of compute node 131A regarding requests serviced by each of the storage volumes 133A-C. The user input regarding requests serviced by each of the storage volumes 133A-C may indicate whether certain storage volumes among storage volumes 133A-C service high or low priority requests, whether certain storage volumes 133 must service their requests in a particular time frame, and numerous other factors. The deployment manager 250 may determine whether one or more of the storage volumes 133A-C should be reassigned (i.e., mounted on a different compute node 131 than the one indicated by the pricing plan) based on the user input regarding requests serviced by each of the storage volumes 133A-C. The deployment manager 250 may further determine the node bandwidth that each of the compute nodes 131 has available in order to determine a compute node 131 to which any storage volumes 133 to be reassigned should be reassigned to.

In the example of FIGS. 3A and 3B, the deployment manager 250 may receive input from the user of compute node 131A indicating that storage volume 133C may service lower priority requests while storage volumes 133A and B service high priority requests requiring fast turn-around times. The deployment manager 250 may also determine that compute node 131A has 8 GB of node bandwidth and that among compute nodes 131B and C, compute node 131B may have the largest amount of available node bandwidth (e.g., 5 GB compared to 2 GB for compute node 131C). At block 415, based on the configuration information of each compute node 131, the available bandwidth of each of the compute nodes 131B and C, and the user indication that storage volume 133C services lower priority requests, the deployment manager 250 may determine that when the cluster is deployed, storage volume 133C should be mounted on compute node 131B.

Referring also to FIG. 3B, at block 420, the deployment manager 250 may deploy the cluster with storage volume 133C mounted on compute node 131B. Once the deployment manager 250 has deployed the cluster with storage volume 133C mounted on compute node 131B, the compute node 131A may begin redirecting requests that require access to storage volume 133C. More specifically, the compute node 131A may be deployed with a redirecting driver 134A mounted thereon. In some embodiments, the redirecting driver 134A may be configured with the IP address of compute node 131B and a port number that the storage driver 135B listens to. The redirecting driver 134A may communicate with the deployment manager 250 to maintain a mapping of where (which compute node 131) each storage volume 133 that was originally supposed to be mounted on the compute node 131A is currently mounted. In addition, the redirecting driver 134A may appear to the user of compute node 131A as a normal interface to the block storage system 132 when a request is sent to it. The redirecting driver 134A may receive requests sent to the compute node 131A that require access to storage volume 133C and redirect those requests to the compute node 131 on which the storage volume 133C is mounted, i.e., compute node 131B (e.g., via the storage driver 135B). It should be noted that although illustrated as having only a single redirecting driver 134A, this is not a limitation and one or more redirecting drivers 134 may be implemented on compute node 131A or distributed over the plurality of compute nodes 131, with each redirecting driver 134 configured to redirect requests to a particular storage volume 133 to a compute node 131 on which the particular storage volume 133 is now mounted. Because each storage volume 133 has its own redirecting driver 134 instance, there is no need for a single redirecting driver 134 to maintain a mapping of multiple storage volumes 133. Instead, each particular redirecting driver 134 may have a single mapping of where (which compute node 131) each storage volume 133 that was originally supposed to be mounted on the particular redirecting driver 134's corresponding compute node 131 is currently mounted.

The compute node 131B may route the request to the storage volume 133C to fulfill the request. The storage volume 133C may process the request and send the request response back to the compute node 131B which may send the request response to the compute node 131A. The compute node 131B may have a storage driver 135B which may be a standard driver that facilitates communication with the storage volume 133C and routing of a request redirected from the compute node 131A to the storage volume 133C and routing of a request response from the storage volume 133C to the compute node 131A.

In this way, the system 100 may utilize inter-cluster bandwidth (which is usually a resource with more bandwidth) to distribute the NB S storage network among all the compute nodes 131. Stated differently, the techniques described herein may enable the compute node 131A to utilize the resources of the entire cluster (including the 5 GB of available node bandwidth of computing device 131B) when accessing storage volumes 133 and not rely solely on the resources that are assigned to each node (e.g., based on a pricing plan). Thus, although storage volumes 133A-C may each have 3 GB of storage volume bandwidth and the compute node 131A has 8 GB of node bandwidth, because the compute node 131A can utilize the node bandwidth of the entire cluster including the 5 GB of available node bandwidth of compute node 131B, it may now take advantage of the full 9 GB of storage volume bandwidth offered by the storage volumes 133A-C. It should be noted that because utilization of node bandwidth of other compute nodes 131 requires an extra network hop (so the request can be rerouted to the appropriate computing device), this will add latency to the completion of the request. However, the ability to utilize the entire storage volume bandwidth is often more important than the addition of a small amount of latency due to an extra network hop. In some embodiments, the ability to deploy a cluster in such a manner so as to utilize the inter-cluster bandwidth as discussed herein may be a configuration of the deployment manager 250 that a user can toggle on or off based on their specific use case.

Figure 5:
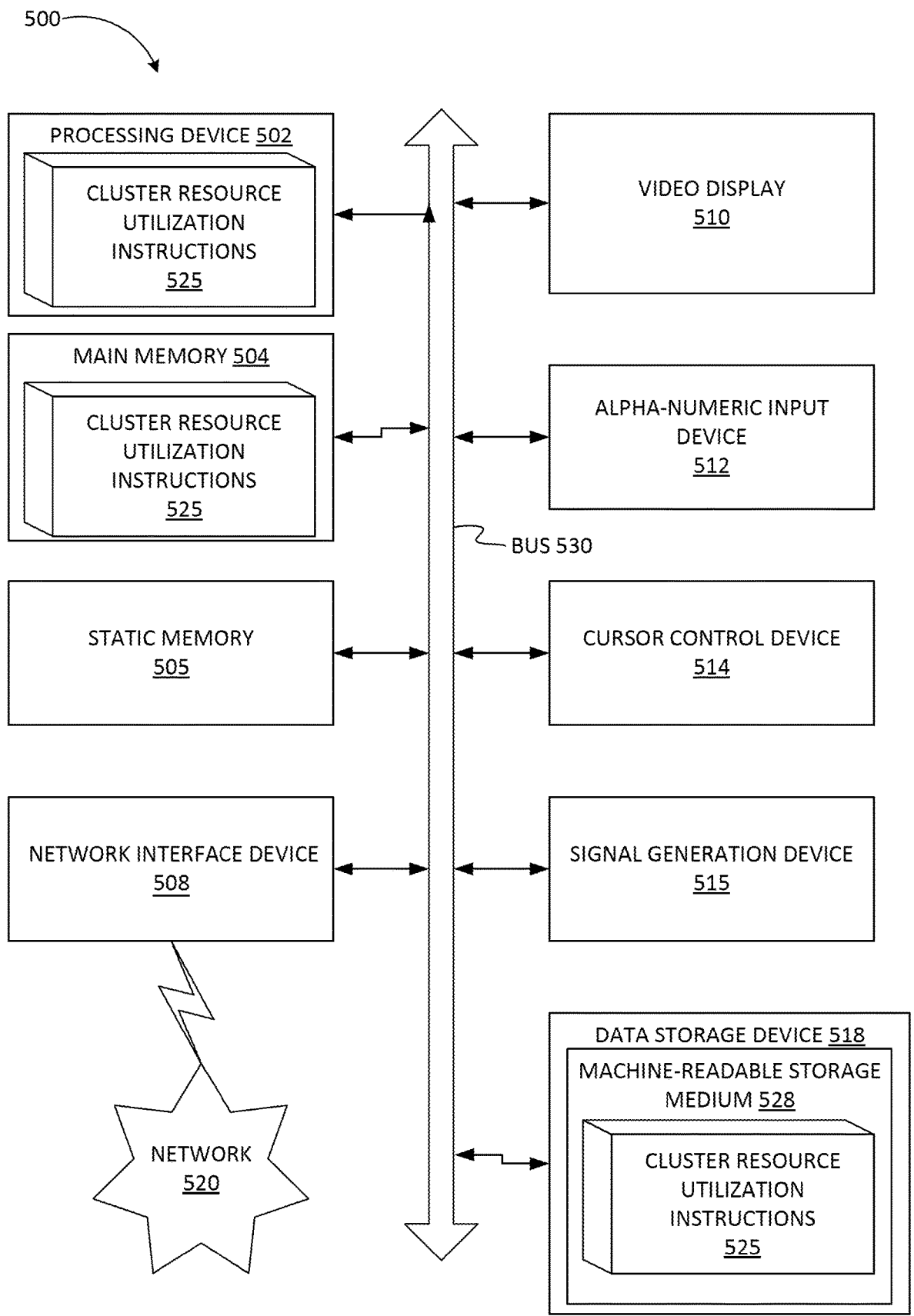
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for enabling a compute node to utilize all the resources of the cluster it is part of.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518 which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute cluster resource utilization instructions 525, for performing the operations and steps discussed herein.

The data storage device 518 may include a machine-readable storage medium 528, on which is stored one or more sets of cluster resource utilization instructions 525 (e.g., software) embodying any one or more of the methodologies of functions described herein. The cluster resource utilization instructions 525 may also reside, completely or at least partially, within the main memory 504 or within the processing device 502 during execution thereof by the computer system 500; the main memory 504 and the processing device 502 also constituting machine-readable storage media. The cluster resource utilization instructions 525 may further be transmitted or received over a network 520 via the network interface device 508.

The machine-readable storage medium 528 may also be used to store instructions to perform a method for enabling a compute node to utilize all the resources of the cluster it is part of, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving configuration information for each of a set of compute nodes in a cluster, wherein the configuration information of each compute node in the cluster indicates a usage by the compute node of each of a set of block storage volumes;
determining, based on the configuration information, that a first compute node cannot utilize a full amount of storage volume bandwidth provided by one or more block storage volumes assigned to it based on a storage subscription plan;
determining, by a processing device, a first block storage volume of the one or more block storage volumes to be reassigned to a second compute node in the cluster; and
deploying the cluster with the first block storage volume mounted on the second compute node in the cluster.

2. The method of claim 1, further comprising:
receiving at the first compute node, a request directed to the first block storage volume;
redirecting the request to the second compute node; and
redirecting a response to the request to the first compute node.

3. The method of claim 2, wherein the first compute node includes a driver to redirect the request to the second compute node based on a mapping of each of the one or more block storage volumes to a compute node of the cluster.

4. The method of claim 1, further comprising:
receiving information indicating an available bandwidth of each of the set of compute nodes in the cluster; and
receiving user input regarding requests serviced by each of the one or more block storage volumes.

5. The method of claim 4, wherein the first block storage volume is determined based on the user input regarding requests serviced by each of the one or more block storage volumes.

6. The method of claim 4, further comprising:
determining the second compute node based on the available bandwidth of each of the set of compute nodes in the cluster.

7. The method of claim 4, wherein the user input regarding requests serviced by each of the one or more block storage volumes comprises:
a priority of requests serviced by each of the one or more block storage volumes; and
a turn-around time of requests serviced by each of the one or more block storage volumes.

8. A system comprising:
a memory; and
a processing device operatively coupled to the memory, the processing device to:
receive configuration information for each of a set of compute nodes in a cluster, wherein the configuration information of each compute node in the cluster indicates a usage by the compute node of each of a set of block storage volumes;
determine, based on the configuration information, that a first compute node cannot utilize a full amount of storage volume bandwidth provided by one or more block storage volumes assigned to it based on a storage subscription plan;
determine a first block storage volume of the one or more block storage volumes to be reassigned to a second compute node in the cluster; and
deploy the cluster with the first block storage volume mounted on the second compute node in the cluster.

9. The system of claim 8, wherein the processing device is further to:
receive at the first compute node, a request directed to the first block storage volume;
redirect, by the first compute node, the request to the second compute node; and
redirect, by the second compute node, a response to the request to the first compute node.

10. The system of claim 9, wherein the first compute node includes a driver to redirect the request to the second compute node based on a mapping of each of the one or more block storage volumes to a compute node of the cluster.

11. The system of claim 8, wherein the processing device is further to:
receive information indicating an available bandwidth of each of the set of compute nodes in the cluster; and
receive user input regarding requests serviced by each of the one or more block storage volumes.

12. The system of claim 11, wherein the processing device determines the first block storage volume based on the user input regarding requests serviced by each of the one or more block storage volumes.

13. The system of claim 11, wherein the processing device is further to:
determine the second compute node based on the available bandwidth of each of the set of compute nodes in the cluster.

14. The system of claim 11, wherein the user input regarding requests serviced by each of the one or more block storage volumes comprises:
a priority of requests serviced by each of the one or more block storage volumes; and
a turn-around time of requests serviced by each of the one or more block storage volumes.

15. A non-transitory computer-readable medium, having instructions stored thereon which when executed by a processing device, cause the processing device to:
receive configuration information for each of a set of compute nodes in a cluster, wherein the configuration information of each compute node in the cluster indicates a usage by the compute node of each of a set of block storage volumes;
determine, based on the configuration information, that a first compute node cannot utilize a full amount of storage volume bandwidth provided by one or more block storage volumes assigned to it based on a storage subscription plan;
determine, by the processing device, a first block storage volume of the one or more block storage volumes to be reassigned to a second compute node in the cluster; and
deploy the cluster with the first block storage volume mounted on the second compute node in the cluster.

16. The non-transitory computer-readable medium of claim 15, wherein the processing device is further to:
receive at the first compute node, a request directed to the first block storage volume;
redirect, by the first compute node, the request to the second compute node; and
redirect, by the second compute node, a response to the request to the first compute node.

17. The non-transitory computer-readable medium of claim 15, wherein the processing device is further to:
receive information indicating an available bandwidth of each of the set of compute nodes in the cluster; and
receive user input regarding requests serviced by each of the one or more block storage volumes.

18. The non-transitory computer-readable medium of claim 17, wherein the processing device determines the first block storage volume based on the user input regarding requests serviced by each of the one or more block storage volumes.

19. The non-transitory computer-readable medium of claim 17, wherein the processing device is further to:
determine the second compute node based on the available bandwidth of each of the set of compute nodes in the cluster.

20. The non-transitory computer-readable medium of claim 17, wherein the user input regarding requests serviced by each of the one or more block storage volumes comprises:
a priority of requests serviced by each of the one or more block storage volumes; and
a turn-around time of requests serviced by each of the one or more block storage volumes.

* * * * *